United States Patent [19]

Grobard

[11] 4,151,789
[45] May 1, 1979

[54] DRYER VENT HOOD ATTACHMENT MEANS

[75] Inventor: Seymour Grobard, West Hartford, Conn.

[73] Assignee: Serv-Well Burner Corporation, Bloomfield, Conn.

[21] Appl. No.: 825,253

[22] Filed: Aug. 17, 1977

[51] Int. Cl.$^2$ .............................................. F23L 17/06
[52] U.S. Cl. ...................................... 98/119; 285/360; 403/349
[58] Field of Search ............................ 34/235; 98/119; 137/527.6; 138/89, 109; 403/349; 285/360

[56] References Cited

U.S. PATENT DOCUMENTS

| | | | |
|---|---|---|---|
| 1,033,187 | 7/1912 | Metzger | 403/349 |
| 2,706,122 | 4/1955 | Bright | 285/360 |
| 2,750,869 | 1/1956 | Cole et al. | 98/119 |
| 2,754,748 | 7/1956 | Daggett | 98/119 |
| 3,171,343 | 3/1965 | Wexler | 98/119 |
| 3,285,155 | 11/1966 | Maltenfort | 98/119 |
| 3,541,945 | 11/1970 | Wexler | 98/119 |
| 3,842,722 | 10/1974 | Smith Miller | 98/119 |

*Primary Examiner*—Ronald C. Capossela
*Attorney, Agent, or Firm*—McCormick, Paulding & Huber

[57] ABSTRACT

A clothes dryer vent hood is fabricated of plastic by an injection molding process, and is provided with an integral rearwardly open annular portion for receiving a tubular member or pipe, which pipe is made of metal, and has several radially inwardly projecting tabs formed at the open end which is to be assembled with the annular portion of the vent hood. This annular portion is molded to define L-shaped grooves for receiving the tabs, and each groove has an abutment defined therein such that the hood can be assembled with the tubular member by axially joining these parts to move the tabs past these abutments in the grooves, followed by a twisting motion of the parts to further lock them together.

8 Claims, 5 Drawing Figures

4,151,789

DRYER VENT HOOD ATTACHMENT MEANS

SUMMARY OF THE INVENTION

This invention relates generally to dryer vent hoods for assembly with tubular dryer vent pipes such as used domestically for venting a clothes dryer. The object of the present invention is to provide a dryer vent hood which can be conveniently fabricated from plastic by an injection molding process, and which plastic vent hood is so designed as to be easily assembled with a rolled metal tubular member of the type commonly used for the portion of the dryer vent which passes through a wall.

More specifically, the plastic dryer vent hood is so designed as to have an integral rearwardly extending annular portion adapted to receive the tubular member, said annular portion and said tubular member having complementary parts so defined that these components can be readily assembled without the necessity for fasteners or for tools. These components are assembled by moving such components axially toward one another and imparting a slight twisting action to these components with the result that they are locked together to prevent disassembly.

In accordance with the present invention the dryer vent hood comprises a generally rectangular housing with a peripherally extending flange to facilitate mounting of the vent hood to an existing wall structure or the like. A rearwardly extending annular portion of the vent hood is provided with radially outwardly open grooves which are preferably L-shaped. One leg of each L-shaped groove is oriented parallel the axis or center line of the annular portion, and the other leg is oriented at slightly more than 90 degrees with respect thereto, so that a tubular member can be readily assembled with such plastic vent hood by a simple axial motion, followed by a slight twisting action of these components with respect to one another. The tubular member includes radially inwardly formed tabs which cooperate with these L-shaped grooves, and each groove also includes an abutment associated with the axial leg portion of the L, such that once the tubular member has been assembled with the plastic dryer vent hood these components cannot be readily disassembled from one another. The vent hood also includes means for pivotally supporting a plastic valve element which is adapted to overlie the open inner end of the annular portion of the vent hood and to be gravity biased to the closed position but readily moved to the open position by the pressure or warm air discharged from the dryer through the tubular member and thence outwardly through the hollow interior of the plastic vent hood and through a downwardly open generally rectangular slot defined at the lower portion of its housing.

DETAILED DESCRIPTION

Clothes dryers generally, particularly those used domestically, require that the heated air from the dryer be vented to the outside of the dwelling in which the clothes dryer is installed. Conventionally available dryer vent hose is suitable for bringing the exhaust air to the exterior wall of the dwelling, and conventional installations typically have a short tubular section to go through the wall. The short tubular section is usually formed at assembly, and has one end adapted to mate with the hose and the other end adapted to mate with a hood. Conventional practice calls for the vent hood itself to be fabricated of metal and to be attached to the tubular member by fasteners. The present invention seeks to obviate the need for such fasteners, and to provide an improved plastic injection molded dryer vent hood which can be assembled with a conventional metal tubular member without the necessity for fasteners or for the associated tools normally required.

Figure 1:
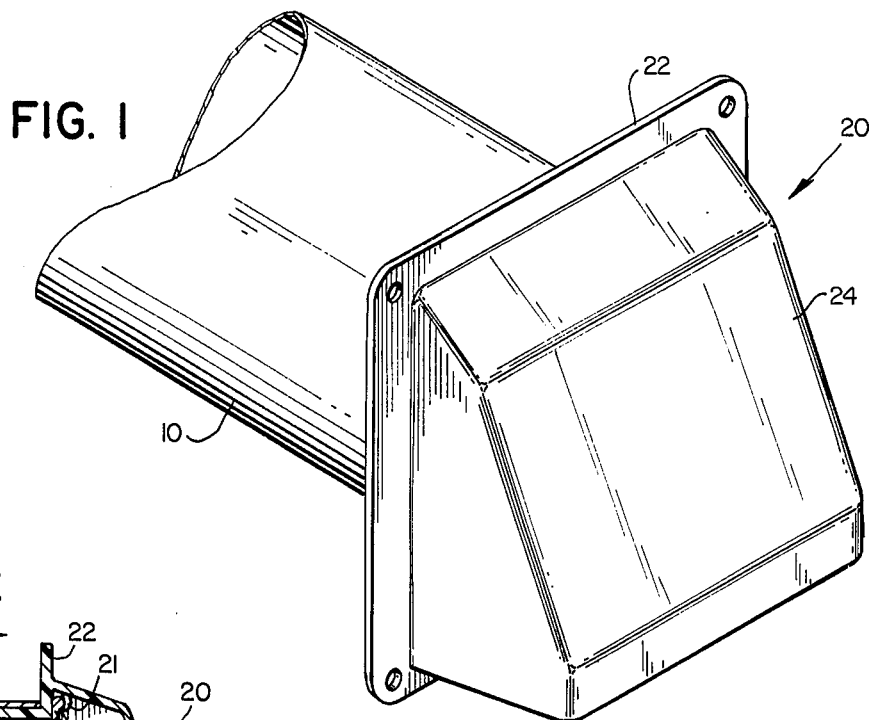
FIG. 1 is a front quartering perspective view of a plastic dryer vent hood constructed in accordance with the present invention and shows such vent hood assembled with a tubular pipe member in accordance with the present invention.
Figure 2:
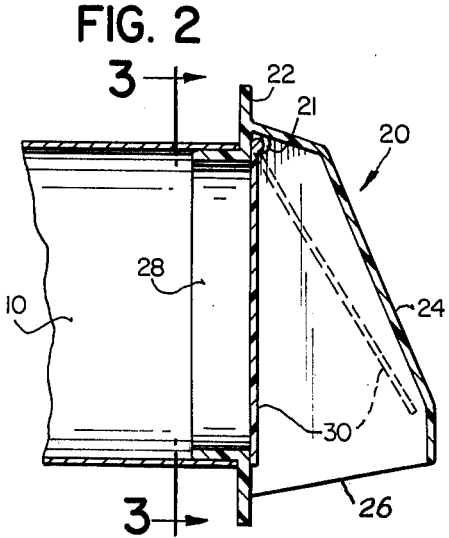
FIG. 2 is a vertical sectional view of the apparatus depicted in FIG. 1.

Turning now to the drawing in greater detail, FIG. 1 shows a tubular member 10 of the type described above assembled with a plastic injection molded dryer vent hood 20 constructed in accordance with the present invention. The vent hood 20 has a generally rectangular configuration and includes a peripherally extending flange 22 which flange is adapted to abut the wall of the dwelling in which the apparatus is installed. A generally rectangular hollow housing 24 is integrally connected to the flange 22 as best shown in FIG. 2 and this housing has parallel side walls 26 integrally connected to a sloping front wall and cooperating with said front wall to define a downwardly open lower portion through which the dryer vent air is adapted to pass.

Still with reference to the plastic dryer vent hood 20 the generally planar flange portion 22 is integrally connected to a rearwardly extending annular portion 28, which annular portion is adapted to be received inside the tubular member 10 and to be permanently connected therewith in a manner to be described with reference to FIGS. 3, 4 and 5. The generally rectangular housing portion of the dryer vent hood is hollow as mentioned previously, and a valve element 30, also fabricated of the same plastic material, is pivotally supported inside the vent hood by means of two or more depending tangs 21, which tangs loosely receive a rib defined for this purpose on the plastic valve element 30. The valve element 30 is gravity biased to the closed position shown by the solid lines in FIG. 2 and is adapted to be moved toward the open position, indicated generally by the broken lines in FIG. 2, as a result of exhaust air being moved through the tubular member 10 for venting through the outlet defined in the vent hood.

Figure 4:
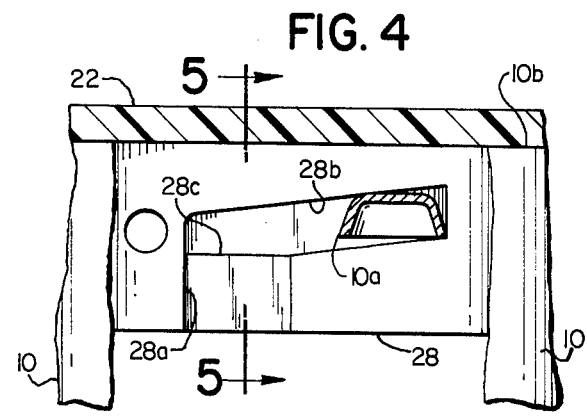
FIG. 4 is a sectional view taken generally on the line 4—4 of FIG. 3.
Figure 3:
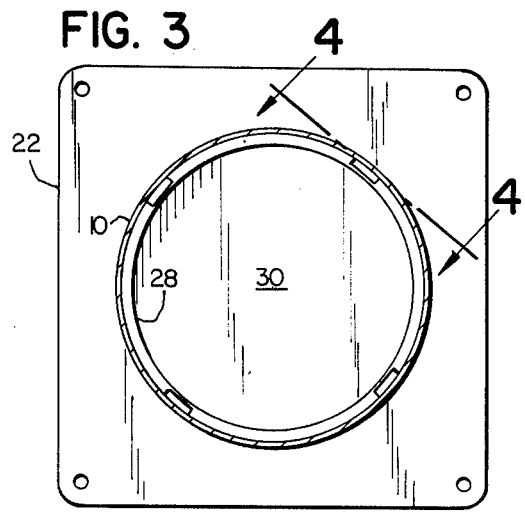
FIG. 3 is a rear sectional view taken generally on the line 3—3 of FIG. 2, and shows the tubular member in cross section.
Figure 5:
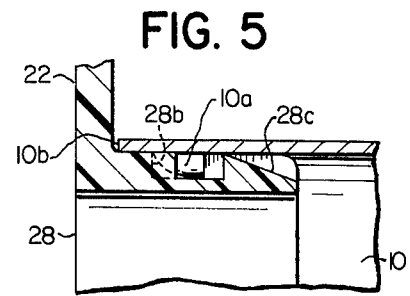
FIG. 5 is a sectional view taken generally on the line 5—5 of FIG. 4.

Turning next to a detailed description of FIGS. 3, 4 and 5, the annular portion 28 of the dryer vent hood 20 can be seen from FIG. 4 to have a generally cylindrical outer surface which defines radially outwardly open grooves provided in circumferential spaced relationship around the annular portion 28. These grooves are adapted to cooperate with radially inwardly bent tabs defined for this purpose on the metal tubular member 10, one of said tabs being illustrated at 10a in FIG. 4. In the embodiment shown these tabs are provided in circumferentially spaced relationship around the tubular member 10, and as best shown in FIG. 5 each such tab 10a is preferably cup-shaped so that the open end of the deformed portion of the annular metal tube 10 faces rearwardly to facilitate joining of the tubular member 10 with the annular portion 28 of the vent hood, and to hinder the subsequent disassembly thereof.

FIG. 4 shows, to larger scale, the configuration of one of these grooves in the annular portion 28 of the plastic dryer vent hood 20. Each such groove is generally L-shaped having one leg 28a of said groove oriented parallel to the axis of the annular portion 28, with the other leg 28b of such L-shaped groove oriented at slightly more than 90 degrees with respect to said one leg 28a. This L-shaped configuration for the groove 28a, 28b and the annular portion 28 permits the tubular member 10 to be assembled therewith by aligning the tabs 10a, 10a with the open axial end portion of the legs 28a, 28a of the grooves in the annular plastic part 28 and moving these components axially together, followed by a slight twisting motion of these components relative to one another, in order to provide each tab 10a in the position shown for it in FIG. 4. The leg 28b of the L-shaped groove may be inclined slightly with respect to a radial plane relative to the axis of annular portion 28, in order to assure that the end 10b of tubular member 10 abuts the back side of the flange 22 of the plastic dryer vent hood 20 as best shown in FIG. 5. Still with reference to FIG. 5, the leg 28a of this L-shaped groove preferably includes an abutment 28c, which the tab 10a must ride over in order to follow the assembly procedure outlined above. Thus, when the tab has overridden the abutment 28c, said tab 10a drops downwardly into the remaining portion of the L-shaped groove 28b as shown in FIG. 4 providing a detent for assuring that these components cannot be easily disassembled.

I claim:

1. A dryer vent hood comprising a tubular member having circumferentially spaced, radially inwardly projecting tabs adjacent one axial end of said member, said vent hood including an annular portion adapted to be received in said tubular member, and a housing integrally connected to said annular portion and defining a downwardly open side communicating with the inside of said annular portion thereof, said annular portion having a generally cylindrical outer surface defining radially outwardly open L-shaped grooves, one leg of each L-shaped groove being oriented parallel the axis of said annular portion, the other leg of said L-shaped groove oriented at slightly more than 90 degrees with respect to said one leg so that said vent hood can be axially assembled with said tubular member to receive said tabs in said L-shaped grooves and held in place by twisting said tubular member with respect to said housing.

2. The dryer vent hood defined by claim 1 wherein each of said L-shaped grooves includes an abutment and associated detent for retaining said tab in its associated slot and preventing disassembly of said hood from said tubular member.

3. The dryer vent hood defined by claim 2 wherein said housing has a generally rectangular external configuration with integral side flanges for attachment to a wall or the like.

4. The dryer vent hood defined by claim 3 wherein said housing has a generally rectangular hollow configuration the interior dimensions of which rectangular housing exceed the diameter of said annular portion, and a flat plate valve element pivotally mounted in said housing, said valve having a rib defined along its upper edge and at least two tangs defined by said housing to receive said rib on said valve element so that said valve element is pivotally supported and gravity biased to close the open end of said annular portion.

5. The dryer vent hood defined by claim 2 wherein said housing has a generally rectangular hollow configuration the interior dimensions of which rectangular housing exceed the diameter of said annular portion, and a flat plate valve element pivotally mounted in said housing, said valve having a rib defined along its upper edge and at least two tangs defined by said housing to receive said rib on said valve element so that said valve element is pivotally supported and gravity biased to close the open end of said annular portion.

6. The dryer vent hood defined in claim 5 wherein said vent hood and said valve element are fabricated from a thermoplastic material.

7. The dryer vent hood defined by claim 1 wherein said housing has a generally rectangular external configuration with integral side flanges for attachment to a wall or the like.

8. The dryer vent hood defined by claim 1 wherein said housing has a generally rectangular hollow configuration the interior dimensions of which rectangular housing exceed the diameter of said annular portion, and a flat plate valve element pivotally mounted in said housing, said valve having a rib defined along its upper edge and at least two tangs defined by said housing to receive said rib on said valve element so that said valve element is pivotally supported and gravity biased to close the open end of said annular portion.

* * * * *